United States Patent
Ke et al.

(10) Patent No.: US 10,374,711 B2
(45) Date of Patent: Aug. 6, 2019

(54) COMMUNICATIONS SYSTEM, METHOD FOR MANAGING COMMUNICATIONS SYSTEM, AND CONTROLLER

(71) Applicant: Huawei Technologies Co., Ltd., Shenzhen (CN)

(72) Inventors: Bo Ke, Shenzhen (CN); Guangsheng Wu, Düsseldorf (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 15/667,100

(22) Filed: Aug. 2, 2017

(65) Prior Publication Data
US 2017/0331554 A1    Nov. 16, 2017

Related U.S. Application Data

(63) Continuation of application No. PCT/CN2015/072118, filed on Feb. 2, 2015.

(51) Int. Cl.
*H04B 10/00*    (2013.01)
*H04B 10/2575*    (2013.01)
(Continued)

(52) U.S. Cl.
CPC ....... *H04B 10/25751* (2013.01); *G08C 23/04* (2013.01); *H04B 10/25* (2013.01);
(Continued)

(58) Field of Classification Search
CPC .. H04B 10/25751; H04B 10/25; G08C 23/04; H04J 14/0232; H04J 14/0247; H04J 7/0008; H04N 21/6118; H04N 21/6168
(Continued)

(56) References Cited

U.S. PATENT DOCUMENTS

| | | |
|---|---|---|
| 2010/0309783 A1 | 12/2010 | Howe |
| 2011/0078755 A1 | 3/2011 | Dai |
| 2011/0085481 A1 | 4/2011 | Ramakrishnan |
| 2011/0137434 A1 | 6/2011 | Chang et al. |
| 2011/0138434 A1 | 6/2011 | Ulm |

(Continued)

FOREIGN PATENT DOCUMENTS

| | | |
|---|---|---|
| CN | 102577181 | 7/2012 |
| CN | 102726005 A | 10/2012 |

(Continued)

OTHER PUBLICATIONS

Foreign Communication From a Counterpart Application, Chinese Application No. 201580000293.6, Chinese Search Report dated Mar. 14, 2018, 2 pages.

(Continued)

*Primary Examiner* — Tesfaldet Bocure
(74) *Attorney, Agent, or Firm* — Conley Rose, P.C.

(57) ABSTRACT

A communications system, a method for managing a communications system, and a controller, where the communications system includes a front-end device and a remote device, where the remote device includes at least one coaxial media converter (CMC), where each CMC includes a data over cable service interface specification (DOCSIS) processor supporting a broadband access service and an edge quadrature amplitude modulation (EQAM) processor supporting a video service, and the at least one CMC and the front-end device are connected using a digital fiber, and the front-end device includes a controller, where the controller is configured to manage the at least one CMC.

17 Claims, 6 Drawing Sheets

(51) Int. Cl.
*H04B 10/25* (2013.01)
*G08C 23/04* (2006.01)
*H04L 7/00* (2006.01)
*H04N 21/61* (2011.01)
*H04J 14/02* (2006.01)

(52) U.S. Cl.
CPC ...... *H04J 14/0232* (2013.01); *H04J 14/0247* (2013.01); *H04L 7/0008* (2013.01); *H04N 21/6118* (2013.01); *H04N 21/6168* (2013.01)

(58) Field of Classification Search
USPC .......................................................... 398/106
See application file for complete search history.

(56) References Cited

U.S. PATENT DOCUMENTS

| | | | | |
|---|---|---|---|---|
| 2011/0200325 | A1* | 8/2011 | Kobyakov | H04B 10/25753 398/25 |
| 2011/0268446 | A1* | 11/2011 | Cune | H04B 10/25753 398/79 |
| 2012/0134673 | A1* | 5/2012 | Palanisamy | H04B 10/25754 398/58 |
| 2013/0111536 | A1 | 5/2013 | McClelland et al. | |
| 2014/0248054 | A1 | 9/2014 | Wu | |
| 2016/0328252 | A1* | 11/2016 | Singh | G06F 9/455 |
| 2018/0332359 | A1* | 11/2018 | Sarosi | H04N 5/76 |

FOREIGN PATENT DOCUMENTS

| | | |
|---|---|---|
| EP | 1965561 A2 | 9/2008 |
| WO | 2007009938 A1 | 1/2007 |

OTHER PUBLICATIONS

Foreign Communication From a Counterpart Application, Chinese Application No. 201580000293.6, Chinese Office Action dated Mar. 26, 2018, 3 pages.

Chapman, J., "DOCSIS Remote PHY Modular Headend Architecture (MHAv2) A Technical Paper prepared for the Society of Cable Telecommunications Engineers by," XP055518636, Oct. 21, 2013, 22 pages.

Foreign Communication From a Counterpart Application, European Application No. 15880695.0, European Office Action dated Oct. 31, 2018, 9 pages.

"Edge QAM Video Stream Interface Specification," Data-Over-Cable-Service-Interface Specifications Modular Headend Architecture, CM-SP-EQAM-VSI-I01-081107, Nov. 7, 2008, 39 pages.

"Edge Resource Manager Interface Specification," Data-Over-Cable-Service-Interface Specifications Modular Headend Architecture, CM-SP-ERMI-I03-081107, Nov. 7, 2008, 127 pages.

'Physical Layer Specification,' Data Over Cable Service Interface Specifications DOCSIS 3.0, CM-SP-PHYv3.0-I11-130808, Aug. 8, 2013, 200 pages.

"CMAP Architecture Technical Report," Data-Over-Cable Service Interface Specification, CM-TR-CMAP-V01-101222, Dec. 22, 2010, 48 pages.

"IEEE Standard for a Precision Clock Synchronization Protocol for Networked Measurement and Control Systems," IEEE Instrumentation and Measurement Society, IEEE Std 1588, Jul. 24, 2008, 289 pages.

Pantelias, N., "Using C-DOCSIS technology to build video on demand and network video service," Broadcom Corporation, May 29, 2013, 10 pages.

English Translation of Pantelias, N., "Using C-DOCSIS technology to build video on demand and network video service," Broadcom Corporation, May 29, 2013, 10 pages.

Foreign Communication From a Counterpart Application, PCT Application No. PCT/CN2015/072118, English Translation of International Search Report dated Oct. 29, 2015, 2 pages.

Foreign Communication From a Counterpart Application, PCT Application No. PCT/CN2015/072118, English Translation of Written Opinion dated Oct. 29, 2015, 5 pages.

Foreign Communication From a Counterpart Application, European Application No. 15880695.0, Extended European Search Report dated Jan. 15, 2018, 9 pages.

* cited by examiner

COMMUNICATIONS SYSTEM, METHOD FOR MANAGING COMMUNICATIONS SYSTEM, AND CONTROLLER

CROSS-REFERENCE TO RELATED APPLICATIONS

This application is a continuation of International Patent Application No. PCT/CN2015/072118 filed on Feb. 2, 2015, which is hereby incorporated by reference in its entirety.

TECHNICAL FIELD

The present disclosure relates to the field of communications technologies, and in particular, to a communications system, a method for managing a communications system, and a controller.

BACKGROUND

In an existing communications system, a conventional multiple system operator (MSO) network uses a system architecture including a front end/sub-front end, an edge equipment room, a fiber node, and a user. The edge equipment room and the fiber node are connected using a point-to-point analog fiber, and the fiber node and the user are connected using a coaxial cable network in a tree topology. An access network that combines a fiber and a coaxial cable is referred to as a hybrid fiber coaxial (HFC) network. An MSO provides a video service and a broadband data service for the user using the HFC network.

A broadband access device and a video modulation device of the HFC network are installed in the edge equipment room. The broadband access device and the video modulation device modulate an Internet Protocol (IP) signal into an analog radio frequency (RF) signal and are connected to the fiber node using the analog fiber. The fiber node converts an optical signal into an RF electrical signal, and then is connected to the user using the coaxial cable. The broadband access device is a cable modem termination system (CMTS) device, and the video modulation device is an edge quadrature amplitude modulation (EQAM) device. In a conventional video service architecture that is supported by an MSO network, a digital video broadcasting service and a video on demand (VOD) service undergo frequency mixing performed by an RF combiner at an edge equipment room, are transmitted to a fiber node using an analog fiber, converted to an electrical signal at the fiber node, and then transmitted to a user using a coaxial cable.

However, such a conventional HFC network has shortcomings such as an insufficient broadband data access capability. In a distributed system architecture based on a data over cable service interface specification (DOCSIS), a physical layer and/or data link layer interface of a DOCSIS front-end module (for example, a CMTS device) is moved to a coverage area of a coaxial cable at a same location as a remote node. Likewise, in the distributed system architecture, to support deployment of a video service, some functions of the EQAM device are retained at a front-end device side, or all functions of the EQAM device are implemented by a remote fiber node. If some functions of the EQAM device are retained at the front-end device side, a new protocol needs to be specified between the front-end device side and the remote node, and there is a need to support a clock synchronization function and control and manage, at the remote node, the EQAM device. As a result, network deployment becomes quite complex.

SUMMARY

Embodiments of the present disclosure provide a communications system, a method for managing a communications system, and a controller in order to reduce complexity of network deployment.

According to a first aspect, a communications system is provided, including a front-end device and a remote node device, where the front-end device is configured to manage the remote node device and transmit a service to the remote node device, where the service includes a broadband access service and a video service. The remote node device includes at least one coaxial media converter (CMC), where each of the at least one CMC includes a DOCSIS front-end module that supports the broadband access service and an EQAM module that supports the video service, and the at least one CMC and the front-end device are connected using a digital fiber, and the front-end device includes a controller, where the controller is configured to manage the at least one CMC.

With reference to the first aspect, in a first possible implementation of the first aspect, the communications system further includes a service management platform that manages the at least one CMC according to the controller, and the controller is further configured to implement a conversion function for an interface configuration protocol between the service management platform and the at least one CMC, and implement a proxy function for a resource management protocol between the service management platform and the EQAM module.

With reference to the first possible implementation of the first aspect, in a second possible implementation of the first aspect, the controller is further configured to obtain a first correspondence between the controller and the at least one CMC, and convert, according to the first correspondence, a first interface configuration protocol between the service management platform and the controller into a second interface configuration protocol between the controller and the at least one CMC.

With reference to the first or the second possible implementation of the first aspect, in a third possible implementation of the first aspect, the controller is further configured to obtain a second correspondence between the controller and at least one EQAM module corresponding to the at least one CMC, and enable, according to the second correspondence, the controller and the at least one EQAM module to perform communication according to the resource management protocol.

With reference to the third possible implementation of the first aspect, in a fourth possible implementation of the first aspect, the resource management protocol includes an edge resource management interface (ERMI) protocol, and the ERMI protocol includes an ERMI-1 registration protocol, an ERMI-2 control protocol, and an ERMI-3 control protocol, where the ERMI-1 registration protocol is used for the service management platform to register the at least one EQAM module using the controller, the ERMI-2 control protocol is used for the service management platform to control the at least one EQAM module using the controller, and the ERMI-3 control protocol is used for the service management platform to control, using the controller, at least one DOCSIS module corresponding to the at least one CMC.

With reference to the second possible implementation of the first aspect, in a fifth possible implementation of the first aspect, the controller includes a logical CMC obtained after the at least one CMC is simulated, the logical CMC includes at least one logical port identity (ID), and the first correspondence includes a one-to-one correspondence between the at least one logical port ID and at least one physical port ID corresponding to the at least one CMC.

With reference to the third or the fourth possible implementation of the first aspect, in a sixth possible implementation of the first aspect, the controller includes a logical EQAM module obtained after the at least one EQAM module is simulated, the logical EQAM module includes at least one logical port ID, and the second correspondence includes a one-to-one correspondence between the at least one logical port ID and at least one physical port ID corresponding to the at least one EQAM module.

With reference to any one of the first aspect or the first to the sixth possible implementations of the first aspect, in a seventh possible implementation of the first aspect, each CMC further includes a remote out of band (R-OOB) module and a proactive network maintenance (PNM) module.

According to a second aspect, a method for managing a communications system is provided, where the communications system includes a front-end device and a remote node device, where the front-end device is configured to manage the remote node device and transmit a service to the remote node device, where the service includes a broadband access service and a video service. The remote node device includes at least one CMC, where each of the at least one CMC includes a DOCSIS front-end module that supports the broadband access service and an EQAM module that supports the video service, and the at least one CMC and the front-end device are connected using a digital fiber. The front-end device includes a controller, and the method includes managing, by the controller, the at least one CMC.

With reference to the second aspect, in a first possible implementation of the second aspect, the communications system further includes a service management platform that manages the at least one CMC according to the controller, and managing, by the controller, the at least one CMC includes implementing a conversion function for an interface configuration protocol between the service management platform and the at least one CMC, and implementing a proxy function for a resource management protocol between the service management platform and the EQAM module.

With reference to the first possible implementation of the second aspect, in a second possible implementation of the second aspect, implementing a conversion function for an interface configuration protocol between the service management platform and the at least one CMC includes obtaining a first correspondence between the controller and the at least one CMC, and converting, according to the first correspondence, a first interface configuration protocol between the service management platform and the controller into a second interface configuration protocol between the controller and the at least one CMC.

With reference to the first or the second possible implementation of the second aspect, in a third possible implementation of the second aspect, implementing a proxy function for a resource management protocol between the service management platform and the EQAM module includes obtaining a second correspondence between the controller and at least one EQAM module corresponding to the at least one CMC, and enabling, according to the second correspondence, the controller and the at least one EQAM module to perform communication according to the resource management protocol.

With reference to the third possible implementation of the second aspect, in a fourth possible implementation of the second aspect, the resource management protocol includes an ERMI protocol, and the ERMI protocol includes an ERMI-1 registration protocol, an ERMI-2 control protocol, and an ERMI-3 control protocol, where the ERMI-1 registration protocol is used for the service management platform to register the at least one EQAM module using the controller, the ERMI-2 control protocol is used for the service management platform to control the at least one EQAM module using the controller, and the ERMI-3 control protocol is used for the service management platform to control, using the controller, at least one DOCSIS module corresponding to the at least one CMC.

With reference to the second possible implementation of the second aspect, in a fifth possible implementation of the second aspect, the controller includes a logical CMC obtained after the at least one CMC is simulated, the logical CMC includes at least one logical port ID, and the first correspondence includes a one-to-one correspondence between the at least one logical port ID and at least one physical port ID corresponding to the at least one CMC.

With reference to the third or the fourth possible implementation of the second aspect, in a sixth possible implementation of the second aspect, the controller includes a logical EQAM module obtained after the at least one EQAM module is simulated, the logical EQAM module includes at least one logical port ID, and the second correspondence includes a one-to-one correspondence between the at least one logical port ID and at least one physical port ID corresponding to the at least one EQAM module.

With reference to any one of the second aspect or the first to the sixth possible implementations of the second aspect, in a seventh possible implementation of the second aspect, each CMC further includes an R-OOB module and a PNM module.

According to a third aspect, a controller is provided, where a communications system in which the controller is located includes a front-end device and a remote node device, and the controller belongs to the front-end device. The front-end device is configured to manage the remote node device and transmit a service to the remote node device, where the service includes a broadband access service and a video service. The remote node device includes at least one CMC, where each of the at least one CMC includes a DOCSIS front-end module that supports the broadband access service and an EQAM module that supports the video service, and the at least one CMC and the front-end device are connected using a digital fiber, and the controller includes a management unit configured to manage the at least one CMC.

With reference to the third aspect, in a first possible implementation of the third aspect, the communications system further includes a service management platform that manages the at least one CMC according to the controller, and the management unit is further configured to implement a conversion function for an interface configuration protocol between the service management platform and the at least one CMC, and implement a proxy function for a resource management protocol between the service management platform and the EQAM module.

With reference to the first possible implementation of the third aspect, in a second possible implementation of the third aspect, the management unit is further configured to obtain a first correspondence between the controller and the at least one CMC, and convert, according to the first correspondence, a first interface configuration protocol between the service management platform and the controller into a second interface configuration protocol between the controller and the at least one CMC.

With reference to the first or the second possible implementation of the third aspect, in a third possible implementation of the third aspect, the management unit is further configured to obtain a second correspondence between the controller and at least one EQAM module corresponding to the at least one CMC, and enable, according to the second correspondence, the controller and the at least one EQAM module to perform communication according to the resource management protocol.

With reference to the third possible implementation of the third aspect, in a fourth possible implementation of the third aspect, the resource management protocol includes an ERMI protocol, and the ERMI protocol includes an ERMI-1 registration protocol, an ERMI-2 control protocol, and an ERMI-3 control protocol, where the ERMI-1 registration protocol is used for the service management platform to register the at least one EQAM module using the controller, the ERMI-2 control protocol is used for the service management platform to control the at least one EQAM module using the controller, and the ERMI-3 control protocol is used for the service management platform to control, using the controller, at least one DOCSIS module corresponding to the at least one CMC.

With reference to the second possible implementation of the third aspect, in a fifth possible implementation of the third aspect, the management unit includes a logical CMC obtained after the at least one CMC is simulated, the logical CMC includes at least one logical port ID, and the first correspondence includes a one-to-one correspondence between the at least one logical port ID and at least one physical port ID corresponding to the at least one CMC.

With reference to the third or the fourth possible implementation of the third aspect, in a sixth possible implementation of the third aspect, the management unit includes a logical EQAM module obtained after the at least one EQAM module is simulated, the logical EQAM module includes at least one logical port ID, and the second correspondence includes a one-to-one correspondence between the at least one logical port ID and at least one physical port ID corresponding to the at least one EQAM module.

With reference to any one of the third aspect or the first to the sixth possible implementations of the third aspect, in a seventh possible implementation of the third aspect, each CMC further includes an R-OOB module and a PNM module.

According to the embodiments of the present disclosure, the EQAM module supporting the video service and the DOCSIS front-end module configured for broadband access are disposed in a same CMC, and the CMC is controlled and managed by a same front-end controller. In this way, no new interface configuration protocol is needed between the EQAM module and the remote node, no clock synchronization is needed, and remote control and management is avoided. Therefore, complexity of network deployment can be reduced according to the present disclosure.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as a Global System for Mobile Communications (GSM) system, a Code Division Multiple Access (CDMA) system, a Wideband CDMA (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), or a Worldwide Interoperability for Microwave Access (WIMAX) communications system.

Figure 1:
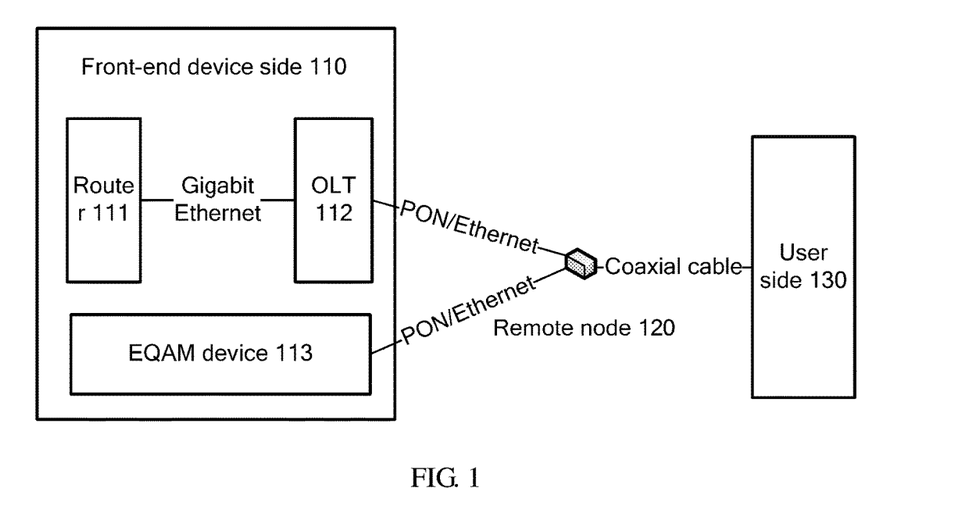
FIG. 1 is a schematic diagram of a distributed communications system architecture.

FIG. 1 is a schematic diagram of a distributed communications system architecture. The distributed communications system architecture shown in FIG. 1 includes a front-end device side 110, a remote node 120, and a user side 130.

It should be understood that the distributed communications system architecture may further include another device. For ease of understanding and description, only devices related to the present disclosure are described in this embodiment of the present disclosure. It should further be understood that an equipment room in this embodiment of the present disclosure may be classified as a front-end device side.

The front-end device side 110 includes a router 111, an optical line terminal (OLT) 112, and an EQAM device 113.

The router 111 and the OLT 112 may be connected using a Gigabit Ethernet. The remote node 120 may be a fiber node. The remote node 120 and the OLT 112 may be connected using a passive optical network (PON) or an Ethernet. The remote node 120 and the user side 130 may be connected using a coaxial cable. The remote node 120 and the EQAM device 113 may be connected using the PON or the Ethernet.

The remote node 120 may include only a physical layer interface of a CMTS device, or may include all data link layer interfaces and all physical layer interfaces of a CMTS device, or may include some data link layer interfaces and some physical layer interfaces of a CMTS device. This embodiment of the present disclosure may be applied to the three distributed system architectures.

However, a data link layer interface of the EQAM device 113 in the foregoing distributed system architecture is located in the front-end device side 110. As a result, a new interface configuration protocol is needed between the EQAM device 113 and the remote node 120. A currently used interface configuration protocol may be an upstream external physical layer interface (UEPI)/downstream external physical layer interface (DEPI) protocol or a Real-Time Transport Protocol (RTP). In addition, clock synchronization is also needed between the EQAM device 113 and the remote node 120. As a result, network deployment becomes quite complex.

Figure 2:
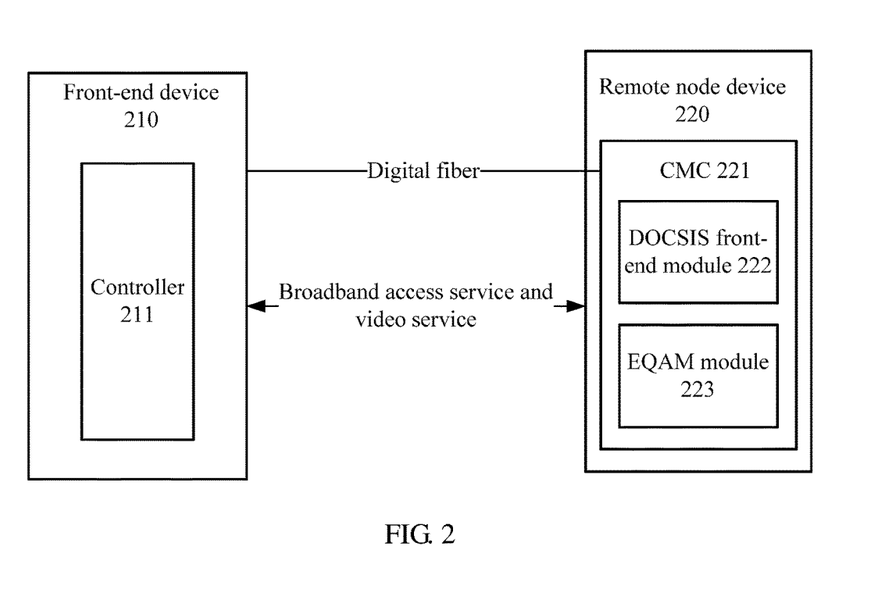
FIG. 2 is a schematic block diagram of a communications system according to an embodiment of the present disclosure.

FIG. 2 is a schematic block diagram of a communications system according to an embodiment of the present disclosure. The communications system shown in FIG. 2 includes a front-end device 210 and a remote node device 220. The front-end device 210 transmits a service to the remote node device 220. The service includes a broadband access service and a video service.

The remote node device 220 includes at least one CMC 221. Each of the at least one CMC 221 includes a DOCSIS front-end module 222 that supports the broadband access service and an EQAM module 223 that supports the video service, and the at least one CMC 221 and the front-end device 210 are connected using a digital fiber. The front-end device 210 may include a controller 211 that is configured to manage the at least one CMC 221.

According to this embodiment of the present disclosure, the EQAM module 223 supporting the video service and the DOCSIS front-end module 222 configured for broadband access are disposed in the same CMC 221, and the CMC 221 is controlled and managed by a same front-end controller. In this way, no new interface configuration protocol is needed between the EQAM module 223 and the remote node, no clock synchronization is needed, and remote control and management is avoided. Therefore, complexity of network deployment can be reduced according to the present disclosure.

It should be understood that the front-end device 210 may further include a device in an equipment room. Optionally, in another embodiment, the controller 211 in this embodiment of the present disclosure may be located in the equipment room. The front-end device 210 may further include another device. For ease of understanding and description, only devices related to the present disclosure are described in this embodiment of the present disclosure. For example, the front-end device may further include a scrambler, a router, an RF combiner, and the like. It should further be understood that the front-end device 210 in FIG. 2 may be understood as the front-end device side 110 in FIG. 1.

The remote node may be a fiber node. In a conventional HFC network, a CMTS function and an EQAM function are integrated in a front-end device. Therefore, the fiber node performs optical-to-electrical signal conversion only. In a distributed system architecture according to this embodiment of the present disclosure, the remote node device 220 may include multiple CMCs 221, and each CMC 221 includes a DOCSIS front-end module 222 and an EQAM module 223. The front-end device 210 may transmit a service to the remote node device 220. The service may include a broadband access service and a video service. The DOCSIS front-end module 222 may support the broadband access service, and the EQAM module 223 may be configured to support the video service. The video service may include a digital video broadcasting service and a VOD service.

The DOCSIS front-end module 222 that supports the broadband access service may be a broadband access device, for example, a CMTS device. The EQAM module 223 that supports the video service may be a video modulation device, for example, an EQAM device. The EQAM device may include an EQAM device that is based on the digital video broadcasting service, or may include an EQAM device that is based on the VOD service. Functions of the EQAM device may include Moving Picture Experts Group (MPEG) video stream processing (functions such as scrambling and video stream multiplexing), quadrature amplitude modulation, and the like.

The DOCSIS front-end module 222 may include a physical layer interface of a CMTS device, or may include all data link layer interfaces and all physical layer interfaces of a CMTS device, or may include some data link layer interfaces and some physical layer interfaces of a CMTS device. This embodiment of the present disclosure may be applied to the three distributed system architectures. The DOCSIS front-end module 222 may be equivalent to the CMTS device. For ease of description, an example in which all data link layer interfaces and all physical layer interfaces are included is used in this embodiment of the present disclosure.

Optionally, in another embodiment, the CMC 221 may further include another module, for example, an R-OOB module and a PNM module. The CMC 221 and the front-end device 210 may be connected using a digital fiber. The digital fiber may include at least one of a PON or an Ethernet.

In an existing distributed communications system, a digital fiber and an analog fiber are needed between a CMC and a front-end device. According to this embodiment of the present disclosure, an EQAM device that needs to perform transmission with the remote node device 220 using an analog fiber is integrated into the remote node device 220 such that a digital fiber can be used for transmission, thereby improving transmission quality.

Optionally, in another embodiment, the front-end device 210 may include a controller 211, and the controller 211 is configured to manage the at least one CMC 221.

It should be understood that the controller 211 may manage the at least one CMC 221, that is, the controller 211 may manage modules of the CMC 221. For example, the controller 211 may manage the EQAM module 223 of the CMC 221, and may also manage the DOCSIS front-end module 222 of the CMC 221.

Optionally, in another embodiment, the controller may manage the at least one CMC using a software defined network (SDN) and a virtual private network (VPN).

According to the SDN and the VPN, the controller 211 may simulate the at least one CMC 221 into a logical CMC. Each CMC 221 may be equivalent to a port, or a board, or a remote subrack of the logical CMC. That is, the controller may be considered as a logical CMC including the at least one CMC. The logical CMC is equivalent to a conventional converged cable access platform (CCAP) device. The CCAP device may include the CMTS device and the EQAM device.

Optionally, in another embodiment, the communications system may further include a service management platform (not shown) that is configured to manage the EQAM module 223. The controller 211 may implement a conversion function for an interface configuration protocol between the service management platform and the at least one CMC 221, and implement a proxy function for a resource management protocol between the service management platform and the EQAM module 223.

The service management platform may be an operation support system (OSS), a network management system (NMS), or an edge resource manager (ERM) platform.

When the service management platform configures an interface for the CMC 221, an Extensible Markup Language (XML)-based network configuration (Netconf) protocol, a Simple Network Management Protocol (SNMP), or a Layer 2 management protocol (for example, a gigabit-capable PON (GPON) optical network unit (ONU) management and control interface (OMCI) protocol, an Ethernet PON (EPON) operation administration and management (OAM) protocol, or an Ethernet-based OAM protocol) may be supported between the controller 211 and the CMC 221, and an interface configuration protocol such as a command line interface (CLI) configuration protocol, the SNMP, or the Netconf protocol may be supported between the service management platform and the controller 211. When an interface configuration protocol between the service management platform and the controller 211 is different from an interface configuration protocol between the controller 211 and the CMC 221, the interface configuration protocol between the service management platform and the controller 211 is converted into the interface configuration protocol between the controller 211 and the CMC 221. After the controller 211 simulates the at least one CMC 221 into the logical CMC, the interface configuration protocol between the service management platform and the controller 211 may be converted into the interface configuration protocol between the controller 211 and the CMC 221. It should be understood that a protocol conversion method used by the controller 211 is not limited in this embodiment of the present disclosure.

An existing resource management protocol between the service management platform (for example, an ERM) and the EQAM module 223 may be an ERMI protocol. The ERM may manage a resource of the EQAM module 223. The controller 211 in this embodiment of the present disclosure may implement a protocol proxy function, that is, perform communication between the ERM and the EQAM module 223 using the ERMI protocol. It should be understood that a method for implementing protocol proxy by the controller 223 is not limited in this embodiment of the present disclosure.

Figure 3:
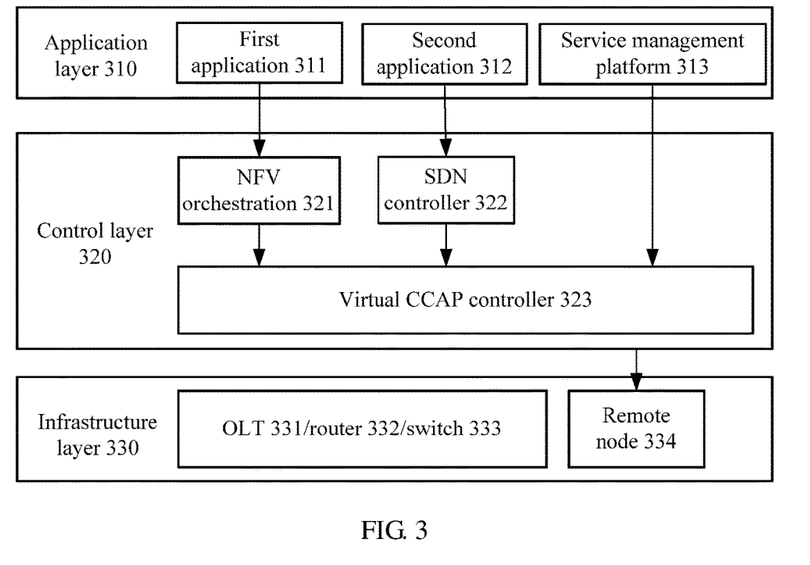
FIG. 3 is a schematic block diagram of a communications system according to another embodiment of the present disclosure.

FIG. 3 is a schematic block diagram of a communications system according to another embodiment of the present disclosure. The communications system shown in FIG. 3 includes an application layer 310, a control layer 320, and an infrastructure layer 330.

The application layer 310 includes a first application 311, a second application 312, and a service management platform 313. The first application 311 may be connected to a network function virtualization orchestration (NFV Orchestration) 321, and the second application 312 may be connected to an SDN controller 322. The NFV Orchestration 321 and the SDN controller 322 are connected to a virtual CCAP controller 323 of the control layer 320. The virtual CCAP controller 323 is the controller 211 shown in FIG. 2 of the foregoing embodiment of the present disclosure.

The infrastructure layer 330 may include an OLT 331, a router 332, a switch 333, or another device, and may further include a remote node 334. The virtual CCAP controller 323 may communicate with the remote node 334 using an interface configuration protocol, for example, a Netconf protocol or an SNMP. An interface configuration protocol, such as a CLI configuration protocol, the SNMP, or the Netconf protocol, may be supported between the virtual CCAP controller 323 and the service management platform 313.

Optionally, in another embodiment, the virtual CCAP controller 323 may obtain a first correspondence between the CCAP controller 323 and the at least one CMC, and convert, according to the first correspondence, a first interface configuration protocol between the service management platform 313 and the virtual CCAP controller 323 into a second interface configuration protocol between the virtual CCAP controller 323 and the at least one CMC.

Optionally, in another embodiment, the virtual CCAP controller 323 may simulate at least one CMC into a logical CMC, the logical CMC may include at least one logical port, and each logical port ID corresponds to a physical port ID of one CMC of the at least one CMC. It should be understood that the first correspondence may include a one-to-one correspondence between the logical port ID of the logical CMC of the virtual CCAP controller 323 and the physical port ID of the at least one CMC.

Figure 4:
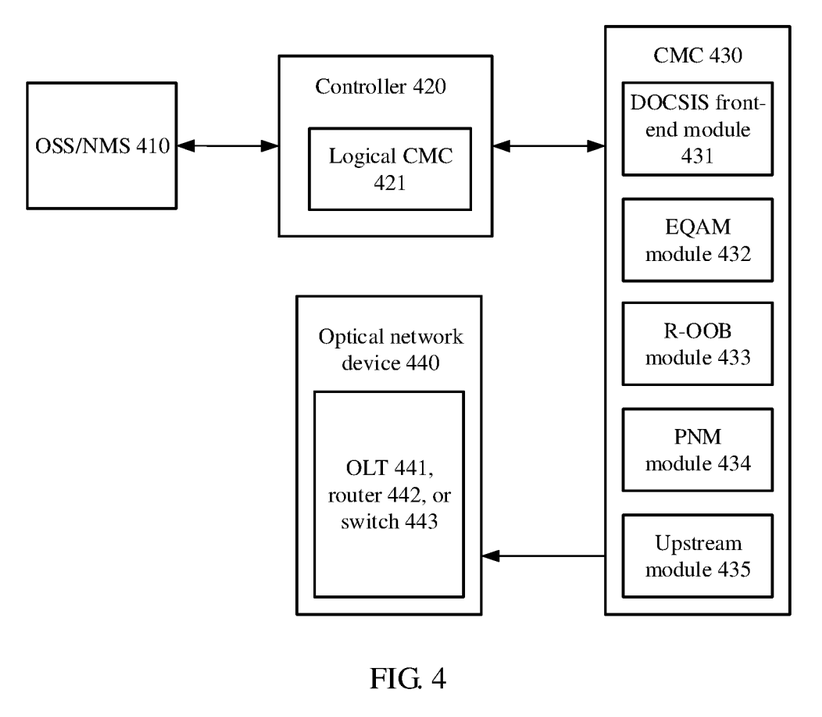
FIG. 4 is a schematic block diagram of CMC management according to an embodiment of the present disclosure.

With reference to FIG. 4, the following details a process in which a controller implements protocol conversion.

FIG. 4 is a schematic block diagram of CMC management according to an embodiment of the present disclosure. As shown in FIG. 4, an OSS/NMS 410, a controller 420, a CMC 430, and an optical network device 440 are included.

The CMC 430 may include a DOCSIS front-end module 431, an EQAM module 432, an R-OOB module 433, a PNM module 434, an upstream module 435, and the like. The optical network device 440 may include an OLT 441, a router 442, or a switch 443.

A management protocol between the optical network device 440 and the upstream module 435 of the CMC 430 may be the same as that in other approaches. That is, the management protocol is an original GPON OMCI protocol, an EPON OAM protocol, or an Ethernet-based OAM protocol.

The controller 420 may simulate multiple CMCs 430 into a logical CMC 421. The logical CMC 421 is equivalent to a CCAP device, and the CCAP device includes a CMTS module and an EQAM module. Each CMC 430 may be equivalent to a port, or a board, or a remote subrack.

Further, the logical CMC 421 may include multiple logical port IDs (not shown), and each logical port ID may be corresponding to a physical port ID (not shown) of the CMC 430.

Optionally, in an embodiment, when a first interface configuration protocol between the OSS/NMS 410 and the controller 420 is different from a second interface configuration protocol between the controller 420 and the CMC 430, a method for performing protocol conversion by the controller 420 may be as follows.

The controller 420 receives a first message sent by the OSS/NMS 410 according to the first interface configuration protocol. The first message includes an IP address of the controller 420.

The controller 420 parses the first message according to the second interface configuration protocol, and generates a second message. The second message includes an IP address of the CMC 430.

The controller 420 sends the second message to the CMC 430.

It should be understood that the parsing procedure may be performed by the controller 420 according to a correspondence between the logical port ID of the logical CMC 421 and the physical port ID of the CMC 430. For example, the controller 420 may determine a physical port ID of a corresponding CMC 430 according to a logical port ID carried in the first message, and will generate a second message that carries an IP address corresponding to the physical port ID of the CMC 430.

Optionally, in another embodiment, the controller 420 may obtain a second correspondence between the controller 420 and at least one EQAM module 432 corresponding to at least one CMC 430, and enable, according to the second correspondence, the controller 420 and the at least one EQAM module 432 to perform communication according to a resource management protocol.

Optionally, in another embodiment, the controller 420 may simulate the at least one CMC 430 into the logical CMC 421, the logical CMC 421 may include at least one logical port, and each logical port ID corresponds to a physical port ID of one CMC 430 of the at least one CMC 430. It should be understood that the first correspondence may include a one-to-one correspondence between the logical port ID of the logical CMC 421 of the controller 420 and the physical port ID of the at least one CMC 430.

Figure 5:
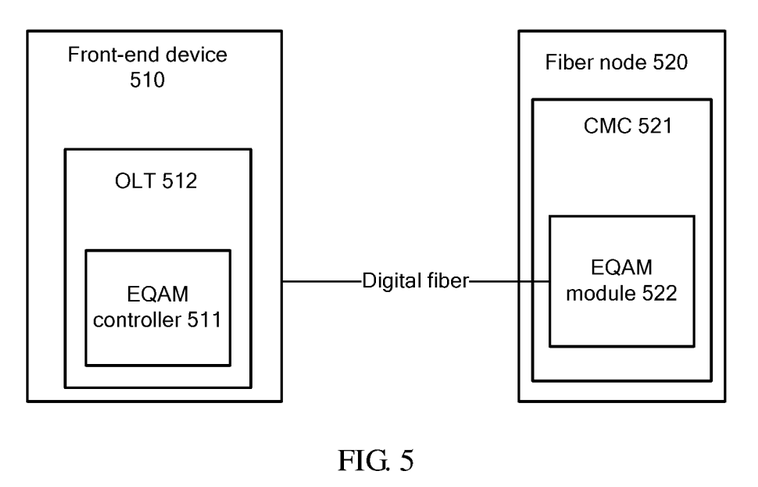
FIG. 5 is a schematic block diagram of EQAM management according to an embodiment of the present disclosure.

FIG. 5 is a schematic block diagram of EQAM management according to an embodiment of the present disclosure. As shown in FIG. 5, a front-end device 510 and a fiber node 520 are included.

It should be understood that another device may be included in FIG. 5. For ease of understanding and description, only devices related to the present disclosure are described in this embodiment of the present disclosure.

The front-end device 510 may include an EQAM controller 511. The EQAM controller 511 may be a function module of the controller 420 shown in FIG. 4. The EQAM controller 511 is a logically independent module, but may be present as an independent device in a product, or may be located inside an OLT. In this embodiment shown in FIG. 5, the EQAM controller 511 may be located inside an OLT 512. The OLT 512 may be located in an equipment room.

The fiber node 520 may include a CMC 521. It should be understood that, although only one CMC 521 is shown in FIG. 5, the fiber node may include multiple CMCs 521. Each CMC 521 may include an EQAM module 522. The EQAM module 522 is an EQAM device.

The EQAM module 522 and the front-end device 510 may be connected using a digital fiber. The EQAM controller 511 of the front-end device 510 may manage the EQAM module 522 of the fiber node 520. The following details an embodiment of how the EQAM controller 511 manages the EQAM module 522.

Optionally, in another embodiment, the EQAM controller 511 may obtain a second correspondence between the EQAM controller 511 and at least one EQAM module 522 corresponding to at least one CMC 521, and enable, according to the second correspondence, the EQAM controller 511 and the at least one EQAM module 522 to perform communication according to a resource management protocol.

Optionally, in another embodiment, the EQAM controller 511 may include a logical EQAM module (not shown) obtained after the at least one EQAM module 522 is simulated, the logical EQAM module includes at least one logical port ID, and the second correspondence includes a one-to-one correspondence between the at least one logical port ID and at least one physical port ID corresponding to the at least one EQAM module 522.

Optionally, in another embodiment, a resource management protocol includes an ERMI protocol, and the ERMI protocol includes an ERMI-1 registration protocol, an ERMI-2 control protocol, and an ERMI-3 control protocol. The ERMI-1 registration protocol is used for a service management platform to register at least one EQAM module 522 using the EQAM controller 511, the ERMI-2 control protocol is used for the service management platform to control the at least one EQAM module 522 using the EQAM controller 511, and the ERMI-3 control protocol is used for the service management platform to control, using the EQAM controller 511, at least one DOCSIS module (not shown) corresponding to the at least one CMC 521.

Figure 6:
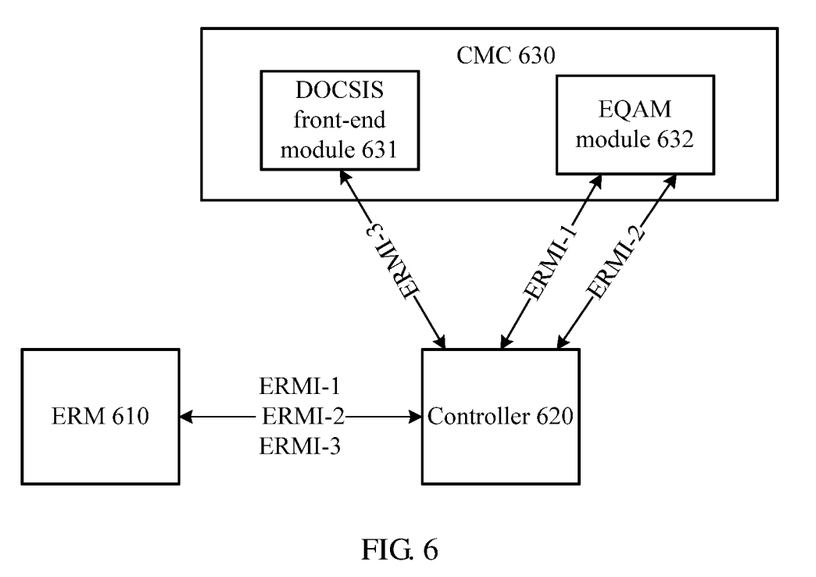
FIG. 6 is a schematic block diagram of EQAM management according to another embodiment of the present disclosure.

With reference to FIG. 6, the following details a process in which a controller implements protocol proxy.

FIG. 6 is a schematic block diagram of EQAM management according to another embodiment of the present disclosure. As shown in FIG. 6, an ERM 610, a controller 620, and a CMC 630 are included. The CMC 630 includes a DOCSIS front-end module 631 and an EQAM module 632.

It should be understood that another device may be included in FIG. 6. For ease of understanding and description, only devices related to the present disclosure are described in this embodiment of the present disclosure. Although only one CMC 630 is shown in FIG. 6, at least one CMC 630 may be included in this embodiment of the present disclosure. For ease of description, only one CMC 630 is described in the present disclosure.

The controller 620 may simulate multiple EQAM modules 632 corresponding to multiple CMCs 630 into a logical EQAM module, and each EQAM module 632 may be equivalent to a port, or a board, or a remote subrack of the logical EQAM module. That is, the controller 620 may include a logical function module (not shown), and the logical function module is the logical EQAM module.

Further, the controller 620 may control the DOCSIS front-end module 631 using an ERMI-3, may complete a registration procedure of the EQAM module 632 using an ERMI-1, and may further control the EQAM module 632 using an ERMI-2. The controller 620 communicates with the ERM 610 using the ERMI protocols, that is, according to the ERMI-1, the ERMI-2, and the EMRI-3.

The logical EQAM module may include multiple logical port IDs, and each logical port ID may be corresponding to a physical port ID of the EQAM module 632. The logical EQAM module may further include a management IP address. Each EQAM module may further include an IP address.

When registering with the logical EQAM module of the controller 620, the EQAM module 632 reports its physical resource to the logical EQAM module using an ERMI-1 update message. The controller 620 may include the reported physical resource and a correspondence between a logical port ID and a physical port ID.

A method for implementing protocol proxy by the controller 620 may be as follows.

The logical EQAM module of the controller 620 receives a first message sent by the ERM 610 using the ERMI protocols. The first message includes a first IP address and an RF port ID. The first IP address may be corresponding to the management IP address of the logical EQAM module, and the RF port ID may be corresponding to the logical port ID of the logical EQAM module.

The logical EQAM module modifies the first IP address in the first message to an IP address of an EQAM module whose physical port ID corresponds to the logical port ID, and generates a second message.

The logical EQAM module sends the second message to the EQAM module 632.

Figure 7:
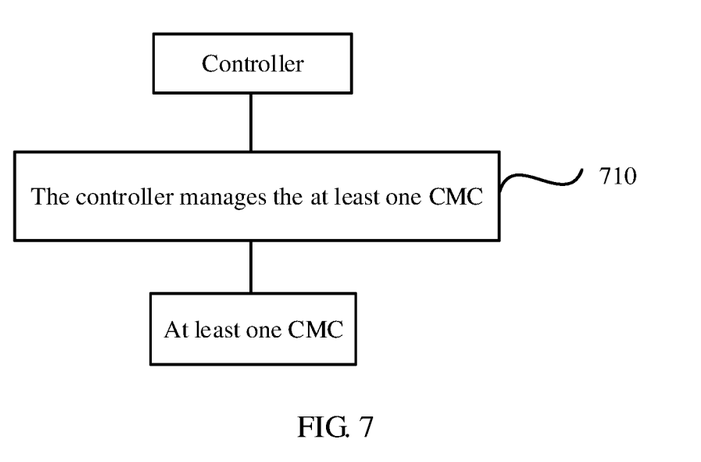
FIG. 7 is a schematic flowchart of a method for managing a communications system according to an embodiment of the present disclosure.

FIG. 7 is a schematic flowchart of a method for managing a communications system according to an embodiment of the present disclosure. The method shown in FIG. 7 may be performed by a controller. The method shown in FIG. 7 may be implemented by the controllers in FIG. 2 to FIG. 6. To avoid repetition, details are not further described herein.

The communications system includes a front-end device (not shown) and a remote node device (not shown). The front-end device is configured to transmit a service to the remote node device. The service includes a broadband access service and a video service. The remote node device includes at least one CMC, where each of the at least one CMC includes a DOCSIS front-end module (not shown) that supports the broadband access service and an EQAM module (not shown) that supports the video service, and the at least one CMC and the front-end device are connected using a digital fiber. The front-end device includes a controller. The method includes the following step.

Step 710: The controller manages the at least one CMC.

According to this embodiment of the present disclosure, the EQAM module supporting the video service and the DOCSIS front-end module configured for broadband access are disposed in a same CMC, and the CMC is controlled and managed by a same front-end controller. In this way, no new interface configuration protocol is needed between the EQAM module and the remote node, no clock synchronization is needed, and remote control and management is avoided. Therefore, complexity of network deployment can be reduced according to the present disclosure.

Optionally, in another embodiment, the communications system further includes a service management platform (not shown) that manages the at least one CMC according to the controller. In step 710, the controller may implement a conversion function for an interface configuration protocol between the service management platform and the at least one CMC, and implement a proxy function for a resource management protocol between the service management platform and the EQAM module.

Optionally, in another embodiment, in a process in which the controller implements the conversion function for the interface configuration protocol between the service management platform and the at least one CMC in step 710, the controller may obtain a first correspondence between the controller and the at least one CMC, and convert, according to the first correspondence, a first interface configuration protocol between the service management platform and the controller into a second interface configuration protocol between the controller and the at least one CMC.

Optionally, in another embodiment, in a process in which the controller implements the proxy function for the resource management protocol between the service management platform and the EQAM module in step 710, the controller may obtain a second correspondence between the controller and at least one EQAM module corresponding to the at least one CMC, and enable, according to the second correspondence, the controller and the at least one EQAM module to perform communication according to the resource management protocol.

Optionally, in another embodiment, the resource management protocol includes an ERMI protocol, and the ERMI protocol includes an ERMI-1 registration protocol, an ERMI-2 control protocol, and an ERMI-3 control protocol. The ERMI-1 registration protocol is used for the service management platform to register the at least one EQAM module using the controller, the ERMI-2 control protocol is used for the service management platform to control the at least one EQAM module using the controller, and the ERMI-3 control protocol is used for the service management platform to control, using the controller, at least one DOCSIS module corresponding to the at least one CMC.

Optionally, in another embodiment, the controller may include a logical CMC obtained after the at least one CMC is simulated, the logical CMC may include at least one logical port ID, and the first correspondence may include a one-to-one correspondence between the at least one logical port ID and at least one physical port ID corresponding to the at least one CMC.

Optionally, in another embodiment, the controller may include a logical EQAM module obtained after the at least one EQAM module is simulated, the logical EQAM module may include at least one logical port ID, and the second correspondence may include a one-to-one correspondence between the at least one logical port ID and at least one physical port ID corresponding to the at least one EQAM module.

Figure 8:
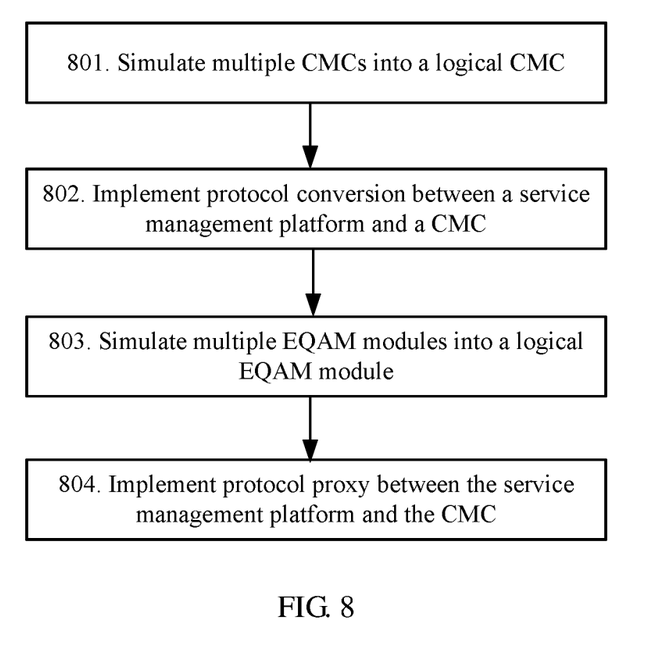
FIG. 8 is a schematic flowchart of a process for managing a communications system according to an embodiment of the present disclosure.

FIG. 8 is a schematic flowchart of a process for managing a communications system according to an embodiment of the present disclosure. The process shown in FIG. 8 may be performed by a controller. The process shown in FIG. 8 may be described with reference to the schematic block diagrams in FIG. 4 and FIG. 6.

Step 801: Simulate multiple CMCs into a logical CMC.

The logical CMC is equivalent to a CCAP device, and the CCAP device includes a CMTS module and an EQAM module. Each CMC may be equivalent to a port, or a board, or a remote subrack.

Further, the logical CMC may include multiple logical port IDs, and each logical port ID may be corresponding to a physical port ID of a CMC.

Step 802: Implement protocol conversion between a service management platform and a CMC.

In FIG. 4, further, when the first interface configuration protocol between the OSS/NMS 410 and the controller 420 is different from the second interface configuration protocol between the controller 420 and the CMC 430, the method for performing protocol conversion by the controller may be as follows.

The controller 420 receives a first message sent by the OSS/NMS 410 according to the first interface configuration protocol. The first message includes an IP address of the controller 420.

The controller 420 parses the first message according to the second interface configuration protocol, and generates a second message. The second message includes an IP address of the CMC 430.

The controller 420 sends the second message to the CMC 430.

It should be understood that the parsing procedure may be performed by the controller 420 according to a correspondence between the logical port ID of the logical CMC 421 and the physical port ID of the CMC 430. For example, the controller 420 may determine a physical port ID of a corresponding CMC 430 according to a logical port ID carried in the first message, and will generate a second message that carries an IP address corresponding to the physical port ID of the CMC 430.

Step 803: Simulate multiple EQAM modules into a logical EQAM module.

With reference to FIG. 6, the controller 620 may simulate the multiple EQAM modules 632 corresponding to the multiple CMCs 630 into a logical EQAM module, and each EQAM module 632 may be equivalent to a port, or a board, or a remote subrack of the logical EQAM module. That is, the controller 620 may include a logical function module, and the logical function module is the logical EQAM module.

Step 804: Implement protocol proxy between the service management platform and the CMC.

With reference to FIG. 6, the controller 620 may control the DOCSIS front-end module 631 using the ERMI-3, may complete the registration procedure of the EQAM module 632 using the ERMI-1, and may further control the EQAM module 632 using the ERMI-2. The controller 620 communicates with the ERM 610 using the ERMI protocols, that is, according to the ERMI-1, the ERMI-2, and the EMRI-3.

Further, the logical EQAM module may include multiple logical port IDs, and each logical port ID may be corresponding to a physical port ID of the EQAM module 632. The logical EQAM module may further include a management IP address. Each EQAM module 632 may further include an IP address.

When registering with the logical EQAM module of the controller 620, the EQAM module 632 reports its physical resource to the logical EQAM module using an ERMI-1 update message. The controller 620 may include the reported physical resource and a correspondence between a logical port ID and a physical port ID.

A method for implementing protocol proxy by the controller 620 may be as follows.

The logical EQAM module of the controller 620 receives a first message sent by the ERM 610 using the ERMI protocol. The first message includes a first IP address and an RF port ID. The first IP address may be corresponding to the management IP address of the logical EQAM module, and the RF port ID may be corresponding to the logical port ID.

The logical EQAM module modifies the first IP address in the first message to an IP address of an EQAM module whose physical port ID corresponds to the logical port ID, and generates a second message.

The logical EQAM module sends the second message to the EQAM module 632.

Figure 9:
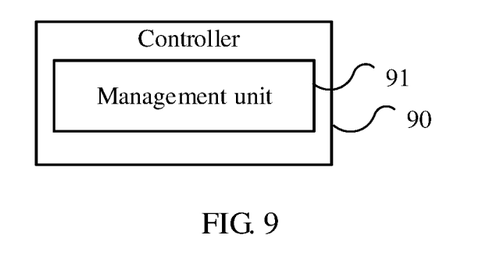
FIG. 9 is a schematic block diagram of a controller according to an embodiment of the present disclosure.

FIG. 9 is a schematic block diagram of a controller 90 according to an embodiment of the present disclosure. As shown in FIG. 9, a communications system in which the controller 90 is located includes a front-end device (not shown) and a remote node device (not shown). The front-end device is configured to transmit a service to the remote node device. The service includes a broadband access service and a video service. The remote node device includes at least one CMC (not shown), where each of the at least one CMC includes a DOCSIS front-end module (not shown) that supports the broadband access service and an EQAM module (not shown) that supports the video service, and the at least one CMC and the front-end device are connected using a digital fiber. The controller 90 includes a management unit 91.

The management unit 91 manages the at least one CMC.

According to this embodiment of the present disclosure, the EQAM module supporting the video service and the DOCSIS front-end module configured for broadband access are disposed in a same CMC, and the CMC is controlled and managed by a same front-end controller. In this way, no new interface configuration protocol is needed between the EQAM module and the remote node, no clock synchronization is needed, and remote control and management is avoided. Therefore, complexity of network deployment can be reduced according to the present disclosure.

Optionally, in another embodiment, the communications system further includes a service management platform (not shown) that manages the at least one CMC according to the controller 90. The management unit 91 may implement a conversion function for an interface configuration protocol between the service management platform and the at least one CMC, and implement a proxy function for a resource management protocol between the service management platform and the EQAM module.

Optionally, in another embodiment, the management unit 91 may obtain a first correspondence between the controller and the at least one CMC, and convert, according to the first correspondence, a first interface configuration protocol between the service management platform and the controller 90 into a second interface configuration protocol between the controller 90 and the at least one CMC.

Optionally, in another embodiment, the management unit 91 may obtain a second correspondence between the controller 90 and at least one EQAM module corresponding to the at least one CMC, and enable, according to the second correspondence, the controller 90 and the at least one EQAM module to perform communication according to the resource management protocol.

Optionally, in another embodiment, the resource management protocol includes an ERMI protocol, and the ERMI protocol includes an ERMI-1 registration protocol, an ERMI-2 control protocol, and an ERMI-3 control protocol. The ERMI-1 registration protocol is used for the service management platform to register the at least one EQAM module using the controller 90, the ERMI-2 control protocol is used for the service management platform to control the at least one EQAM module using the controller 90, and the ERMI-3 control protocol is used for the service management platform to control, using the controller 90, at least one DOCSIS module corresponding to the at least one CMC.

Optionally, in another embodiment, the management unit 91 may include a logical CMC obtained after the at least one CMC is simulated, the logical CMC includes at least one logical port ID, and the first correspondence may include a one-to-one correspondence between the at least one logical port ID and at least one physical port ID corresponding to the at least one CMC.

Optionally, in another embodiment, the management unit 91 may include a logical EQAM module obtained after at least one EQAM module is simulated, the logical EQAM module includes at least one logical port ID, and the second correspondence includes a one-to-one correspondence between the at least one logical port ID and at least one physical port ID corresponding to the at least one EQAM module.

Optionally, in another embodiment, each CMC further includes an R-OOB module and a PNM module.

Figure 10:
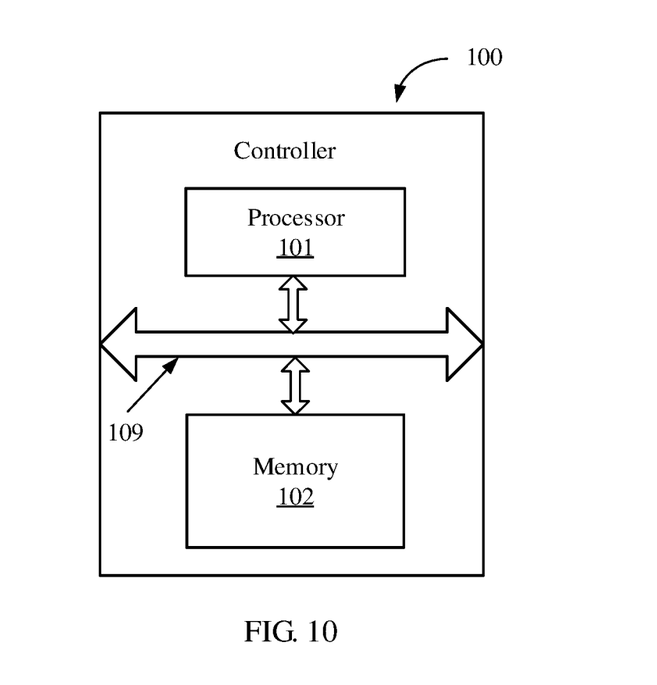
FIG. 10 is a schematic block diagram of a controller according to another embodiment of the present disclosure.

FIG. 10 is a schematic block diagram of a controller 100 according to another embodiment of the present disclosure. The controller 100 in FIG. 10 may be configured to implement steps and methods in the foregoing method embodiments. The controller 100 in FIG. 10 includes a processor 101 and a memory 102. The processor 101 and the memory 102 are connected using a bus system 109.

The processor 101 controls operations of the controller 100. The memory 102 may include a read-only memory (ROM) and a random access memory (RAM), and provides instructions and data for the processor 101. A part of the memory 102 may further include a non-volatile RAM (NVRAM). Components in the controller 100 are coupled together using the bus system 109. The bus system 109 includes not only a data bus, but also a power supply bus, a control bus, and a status signal bus. However, for clear description, various buses are denoted by the bus system 109 in the diagram.

The processor 101 may be an integrated circuit chip with a signal processing capability. The foregoing processor 101 may be a general purpose processor, a digital signal processor (DSP), an application-specific integrated circuit (ASIC), a field-programmable gate array (FPGA) or another programmable logic device, a discrete gate or transistor logic device, or a discrete hardware component, and may implement or execute methods, steps and logical block diagrams disclosed in the embodiments of the present disclosure. The general purpose processor may be a microprocessor, or the processor 101 may be any conventional processor or the like. The processor 101 reads information in the memory 102 and controls each component of the controller 100 in combination with hardware of the processor 101.

The method in FIG. 7 may be implemented in the controller 100 in FIG. 10. To avoid repetition, details are not further described.

The communications system includes a front-end device (not shown) and a remote node device (not shown). The front-end device is configured to transmit a service to the remote node device. The service includes a broadband access service and a video service. The remote node device includes at least one CMC (not shown), where each of the at least one CMC includes a DOCSIS front-end module (not shown) that supports the broadband access service and an EQAM module (not shown) that supports the video service, and the at least one CMC and the front-end device are connected using a digital fiber. The front-end device includes the controller 100.

Further, under control of the processor 101, the controller 100 completes the operation of managing the at least one CMC.

According to this embodiment of the present disclosure, the EQAM module supporting the video service and the DOCSIS front-end module configured for broadband access are disposed in a same CMC, and the CMC is controlled and managed by a same front-end controller 100. In this way, no new interface configuration protocol is needed between the EQAM module and the remote node, no clock synchronization is needed, and remote control and management is avoided. Therefore, complexity of network deployment can be reduced according to the present disclosure.

Optionally, in another embodiment, the processor 101 may implement a conversion function for an interface configuration protocol between the service management platform and the at least one CMC, and implement a proxy function for a resource management protocol between the service management platform and the EQAM module.

Optionally, in another embodiment, the processor 101 may obtain a first correspondence between the controller 100 and the at least one CMC, and convert, according to the first correspondence, a first interface configuration protocol between the service management platform and the controller 100 into a second interface configuration protocol between the controller 100 and the at least one CMC.

Optionally, in another embodiment, a processor 101 may obtain a second correspondence between the controller 100 and at least one EQAM module corresponding to the at least one CMC, and enable, according to the second correspondence, the controller 100 and the at least one EQAM module to perform communication according to a resource management protocol.

Optionally, in another embodiment, the resource management protocol includes an ERMI protocol, and the ERMI protocol includes an ERMI-1 registration protocol, an ERMI-2 control protocol, and an ERMI-3 control protocol. The ERMI-1 registration protocol is used for the service management platform to register the at least one EQAM module using the controller 100, the ERMI-2 control protocol is used for the service management platform to control the at least one EQAM module using the controller 100, and the ERMI-3 control protocol is used for the service management platform to control, using the controller 100, at least one DOCSIS module corresponding to the at least one CMC.

Optionally, in another embodiment, the controller 100 includes a logical CMC obtained after the at least one CMC is simulated, the logical CMC includes at least one logical port ID, and the first correspondence may include a one-to-one correspondence between the at least one logical port ID and at least one physical port ID corresponding to the at least one CMC.

Optionally, in another embodiment, the controller 100 includes a logical EQAM module obtained after the at least one EQAM module is simulated, the logical EQAM module includes at least one logical port ID, and the second correspondence includes a one-to-one correspondence between the at least one logical port ID and at least one physical port ID corresponding to the at least one EQAM module.

Optionally, in another embodiment, each CMC further includes an R-OOB module and a PNM module.

It should be understood that "an embodiment" mentioned in the whole specification does not mean that particular features, structures, or characteristics related to the embodiment are included in at least one embodiment of the present disclosure. Therefore, "in an embodiment" appearing throughout the specification does not refer to a same embodiment. In addition, these particular features, structures, or characteristics may be combined in one or more embodiments using any appropriate manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining B according to A does not mean that B is determined according to A only, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is only an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation The computer-readable medium may include a RAM, a ROM, an electrically erasable programmable ROM (EEPROM), a compact disc ROM (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a FLOPPY DISK and a BLU-RAY DISC. The disk generally copies data by a magnetic means, and the disc copies data optically by a laser means. The foregoing combination should also be included in the protection scope of the computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A communications system, comprising:
a front-end device;
a remote node device coupled to the front-end device; and
a service management platform coupled to the remote node,
wherein the front-end device is configured to:
    manage the remote node device; and
    transmit a service to the remote node device, and
    wherein the service comprises a broadband access service and a video service, wherein the remote node device comprises at least one coaxial media converter (CMC), wherein each of the at least one CMC comprises:
    a data over cable service interface specification (DOCSIS) front-end device supporting the broadband access service;
    an edge quadrature amplitude modulation (EQAM) device supporting the video service;
    a remote out of band (R-OOB) device; and
    a proactive network maintenance (PNM) device,
wherein the at least one CMC and the front-end device are coupled using a digital fiber, and
wherein the front-end device comprises a controller configured to manage the at least one CMC.

2. The communications system of claim 1, further comprising a service management platform configured to manage the at least one CMC according to the controller, and wherein the controller is further configured to:
    implement a conversion function for an interface configuration protocol between the service management platform and the at least one CMC; and implement a proxy function for a resource management protocol between the service management platform and the EQAM device.

3. The communications system of claim 1, wherein the controller is further configured to:
obtain a first correspondence between the controller and the at least one CMC; and
convert, according to the first correspondence, a first interface configuration protocol between the service management platform and the controller into a second interface configuration protocol between the controller and the at least one CMC.

4. The communications system of claim 1, wherein the controller is further configured to:
obtain a second correspondence between the controller and at least one EQAM device corresponding to the at least one CMC; and
enable, according to the second correspondence, the controller and the at least one EQAM device to perform communication according to the resource management protocol.

5. The communications system of claim 4, wherein the resource management protocol comprises an edge resource management interface (ERMI) protocol, wherein the ERMI protocol comprises an ERMI-1 registration protocol, an ERMI-2 control protocol, and an ERMI-3 control protocol, wherein the ERMI-1 registration protocol is used for the service management platform to register the at least one EQAM device using the controller, wherein the ERMI-2 control protocol is used for the service management platform to control the at least one EQAM device using the controller, and wherein the ERMI-3 control protocol is used for the service management platform to control, using the controller, at least one DOCSIS front-end device corresponding to the at least one CMC.

6. The communications system of claim 3, wherein the controller comprises a logical CMC obtained after the at least one CMC is simulated, wherein the logical CMC comprises at least one logical port identity (ID), and wherein the first correspondence comprises a one-to-one correspondence between the at least one logical port ID and at least one physical port ID corresponding to the at least one CMC.

7. The communications system of claim 4, wherein the controller comprises a logical EQAM device obtained after the at least one EQAM device is simulated, wherein the logical EQAM device comprises at least one logical port identity (ID), and wherein the second correspondence comprises a one-to-one correspondence between the at least one logical port ID and at least one physical port ID corresponding to the at least one EQAM device.

8. A method, comprising:
managing a communications system comprising a front-end device, a remote node device, and a service management platform, wherein the front-end device is configured to manage the remote node device and transmit a service to the remote node device, wherein the service comprises a broadband access service and a video service, wherein the remote node device comprises at least one coaxial media converter (CMC), wherein each of the at least one CMC comprises a data over cable service interface specification (DOCSIS) front-end device supporting the broadband access service and an edge quadrature amplitude modulation (EQAM) device supporting the video service, wherein the at least one CMC and the front-end device are connected using a digital fiber, and wherein the front-end device comprises a controller; and
managing, by the service management platform according to the controller, the at least one CMC, wherein managing the at least one CMC comprises:
implementing a conversion function for an interface configuration protocol between the service management platform and the at least one CMC; and
implementing a proxy function for a resource management protocol between the service management platform and the EQAM device.

9. The method of claim 8, wherein implementing the conversion function comprises:
obtaining a first correspondence between the controller and the at least one CMC; and
converting, according to the first correspondence, a first interface configuration protocol between the service management platform and the controller into a second interface configuration protocol between the controller and the at least one CMC.

10. The method of claim 8, wherein implementing the proxy function comprises:
obtaining a second correspondence between the controller and at least one EQAM device corresponding to the at least one CMC; and
enabling, according to the second correspondence, the controller and the at least one EQAM device to perform communication according to the resource management protocol.

11. The method of claim 10, wherein the resource management protocol comprises an edge resource management interface (ERMI) protocol, wherein the ERMI protocol comprises an ERMI-1 registration protocol, an ERMI-2 control protocol, and an ERMI-3 control protocol, wherein the ERMI-1 registration protocol is used for the service management platform to register the at least one EQAM device using the controller, wherein the ERMI-2 control protocol is used for the service management platform to control the at least one EQAM device using the controller, and wherein the ERMI-3 control protocol is used for the service management platform to control, using the controller, at least one DOCSIS front-end device corresponding to the at least one CMC.

12. The method of claim 9, wherein the controller comprises a logical CMC obtained after the at least one CMC is simulated, wherein the logical CMC comprises at least one logical port identity (ID), and wherein the first correspondence comprises a one-to-one correspondence between the at least one logical port ID and at least one physical port ID corresponding to the at least one CMC.

13. The method of claim 10, wherein the controller comprises a logical EQAM device obtained after the at least one EQAM processor is simulated, wherein the logical EQAM device comprises at least one logical port identity (ID), and wherein the second correspondence comprises a one-to-one correspondence between the at least one logical port ID and at least one physical port ID corresponding to the at least one EQAM device.

14. A controller, comprising:
a memory comprising instructions; and
a processor coupled to the memory,
wherein a communications system in which the controller is located comprises a front-end device, a remote node device, and a service management platform,
wherein the controller belongs to the front-end device,
wherein the instructions cause the processor to be configured to control the service management platform, wherein the instructions cause the processor to be configured to manage at least one coaxial media converter (CMC) at least in part by causing the processor to be configured to:
  implement a conversion function for an interface configuration protocol between the service management platform and the at least one CMC; and
  implement a proxy function for a resource management protocol between the service management platform and an edge quadrature amplitude modulation (EQAM) device supporting a video service,
wherein the front-end device is configured to manage the remote node device and transmit a service to the remote node device,
wherein the service comprises a broadband access service and the video service,
wherein the remote node device comprises at least one CMC,
wherein each of the at least one CMC comprises a data over cable service interface specification (DOCSIS) front-end device supporting the broadband access service and the EQAM device, and
wherein the at least one CMC and the front-end device are coupled using a digital fiber.

15. The controller of claim 14, wherein the instructions further cause the processor to be configured to:
  obtain a first correspondence between the controller and the at least one CMC; and
  convert, according to the first correspondence, a first interface configuration protocol between the service management platform and the controller into a second interface configuration protocol between the controller and the at least one CMC.

16. The controller of claim 14, wherein the instructions further cause the processor to be configured to:
  obtain a second correspondence between the controller and at least one EQAM device corresponding to the at least one CMC; and
  enable, according to the second correspondence, the controller and the at least one EQAM device to perform communication according to the resource management protocol.

17. The controller of claim 15, wherein the instructions further cause the processor to be configured to obtain a logical CMC after the at least one CMC is simulated, wherein the logical CMC comprises at least one logical port identity (ID), and wherein the first correspondence comprises a one-to-one correspondence between the at least one logical port ID and at least one physical port ID corresponding to the at least one CMC.

* * * * *